US008419108B2

(12) United States Patent
Leterrier et al.

(10) Patent No.: US 8,419,108 B2
(45) Date of Patent: Apr. 16, 2013

(54) ASSEMBLY OF A TAILGATE SHELL AND OF A COMPONENT INTENDED TO BE ATTACHED TO THE SHELL

(75) Inventors: Franck Leterrier, Saint Priest (FR); Bertrand Hache, Saint Cyr (FR)

(73) Assignee: Compagnie Plastic Omnium, Lyons (FR)

( * ) Notice: Subject to any disclaimer, the term of this patent is extended or adjusted under 35 U.S.C. 154(b) by 166 days.

(21) Appl. No.: 12/740,825

(22) PCT Filed: Oct. 31, 2008

(86) PCT No.: PCT/FR2008/051969
§ 371 (c)(1),
(2), (4) Date: Sep. 1, 2010

(87) PCT Pub. No.: WO2009/056775
PCT Pub. Date: May 7, 2009

(65) Prior Publication Data
US 2010/0314902 A1    Dec. 16, 2010

(30) Foreign Application Priority Data
Oct. 31, 2007  (FR) ..................................... 07 58741

(51) Int. Cl.
*B60J 5/10*  (2006.01)
(52) U.S. Cl.
USPC ..... 296/146.5; 296/181.2; 296/56; 296/146.8
(58) Field of Classification Search ................ 296/181.2, 296/50, 56, 57.1, 146.5, 146.8; 49/DIG. 2
See application file for complete search history.

(56) References Cited

U.S. PATENT DOCUMENTS

| 4,945,682 | A | * | 8/1990 | Altman et al. ................... 49/502 |
| 6,053,562 | A | | 4/2000 | Bednarski |
| 8,182,025 | B2 | * | 5/2012 | Auchter-Bruening ........ 296/191 |
| 2004/0164580 | A1 | * | 8/2004 | Armstrong et al. ............. 296/50 |
| 2007/0090662 | A1 | * | 4/2007 | Katterloher et al. ......... 296/57.1 |

(Continued)

FOREIGN PATENT DOCUMENTS

| DE | 2935230 A1 | 3/1981 |
| EP | 0695848 A2 | 2/1996 |

(Continued)

OTHER PUBLICATIONS

International Search Report from PCT/FR2008/051969 dated May 20, 2009; Sleightholme-Albanis.

(Continued)

*Primary Examiner* — Jason S Morrow
(74) *Attorney, Agent, or Firm* — BCF LLP

(57) ABSTRACT

The present invention relates to an assembly comprising a tailgate box and at least one link designed to be fitted on the box. The box is designed to receive a part that is fastened to the box by adhesive, said box having for this purpose an adhesive track, the box also including at least one lateral upright comprising a section member of open cross-section with the opening therein interrupting the adhesive track. The link comprises an additional segment of adhesive track, and the link and the upright being shaped so that the link can be fitted on the upright in such a manner that it closes the cross-section of the section member and causes the additional segment to span the interruption in the adhesive track.

15 Claims, 2 Drawing Sheets

U.S. PATENT DOCUMENTS

2007/0145773 A1* 6/2007 Saitoh .................... 296/146.8
2009/0056868 A1* 3/2009 Basu et al. ................ 156/295
2011/0074179 A1* 3/2011 Kuntze et al. ............. 296/146.6

FOREIGN PATENT DOCUMENTS

| | | |
|---|---|---|
| EP | 1120303 A1 | 8/2001 |
| EP | 1803597 A1 | 7/2007 |
| FR | 2768085 A1 | 3/1999 |
| JP | 06219157 A | 8/1994 |

OTHER PUBLICATIONS

English Abstract of EP 0695848 published on Feb. 7, 1996.
English Abstract of EP 1120303 published on Aug. 1, 2001.
English Abstract of FR 2768085 published on Mar. 12, 1999.
English Abstract of JP 06219157 published on Aug. 9, 1994.

* cited by examiner

Fig. 2bis

ASSEMBLY OF A TAILGATE SHELL AND OF A COMPONENT INTENDED TO BE ATTACHED TO THE SHELL

CROSS-REFERENCE

The present application is the United States National Stage Entry of International Application Number PCT/FR2008/051969, filed Oct. 31, 2008, the entirety of which is incorporated herein by reference.

TECHNICAL FIELD

The present invention relates to the technical field of motor vehicle tailgates.

BACKGROUND OF THE INVENTION

In the state of the art, a tailgate box is known that comprises bottom and top portions, each designed to be covered by a bodywork skin, the top and bottom portions being interconnected by two lateral uprights between which there is provided an opening for receiving a rear window.

Such a box is made of sheet metal and is constituted by closed section members. The rear window is applied to the box by adhesive, the box including for this purpose a continuous adhesive track. One or more bodywork skins are also fitted to the box by adhesive so as to form the tailgate, likewise by means of continuous adhesive tracks. Such tracks serve to ensure that the tailgate is watertight.

Nevertheless, the cost of fabricating such a tailgate is relatively high, in particular because of the process of shaping the sheet metal.

OBJECT AND SUMMARY OF THE INVENTION

An object of the invention is to remedy those drawbacks by providing an assembly enabling a tailgate to be formed, which assembly is inexpensive to fabricate and complies with the usual specifications for a tailgate, i.e. it is leaktight and closes the rear of the vehicle in leaktight manner.

To this end, the invention provides an assembly comprising a tailgate box and at least one link designed to be fitted on the box, the box being designed to receive a part that is fastened to the box by adhesive, said box having for this purpose an adhesive track, the box also including at least one lateral upright comprising a section member of open cross-section with the opening therein interrupting the adhesive track. The link comprises an additional segment of adhesive track, the link and the upright being shaped so that the link can be fitted on the upright in such a manner that it closes the cross-section of the section member and causes the additional segment to span the interruption in the adhesive track.

Thus, because of its open shape, the box can be made out of plastics material by molding, a process that is less expensive than stamping, and it can be made in a single molding operation without any moving parts in the mold, the shape of the box being suitable for unmolding merely by opening the mold.

In addition, in spite of its open shape, the box does not need to be covered in a single bodywork part in order to ensure that the tailgate is leaktight. The link provides the box with sufficient sealing at each interface between the bodywork skins or between the bodywork skins and the window, by locally closing the open section of the box section member where the skins or the window are adhesively bonded.

The tailgate is thus even less expensive. Fabricating the bodywork skin as a plurality of elements of simple shapes and of small dimensions is much less expensive than fabricating said bodywork skin as a single piece, which would then be more complex in shape and would require a mold of larger dimensions.

In addition, since the tailgate is made of plastics material, it is lighter in weight than the prior art tailgate.

Furthermore, because of the links, design freedom is as great with the tailgate of the invention as in the state of the art. For example, the shape of the tailgate does not prevent the window being fitted by adhesive even though it needs to cover the lateral uprights so as to extend as far as the outer sides of the tailgate. The tailgate in this situation is made leaktight also by the links.

In a particular embodiment, the link includes at least one sealing gasket constituting an end of the link for receiving the additional segment of the adhesive track. The gasket also provides better sealing of the connection between the window and the box, at the interface of the link and the box.

The gasket is stressed in compression between the window and the box. It therefore matches the shape of the box and minimizes the passage left between the box and the link through which water might penetrate. The tailgate is thus made even more watertight. In addition, sealing is ensured over a long period, since the compressed gasket suffers very little fatigue.

In a particular embodiment, the gasket is made integrally with the remainder of the link. In particular, the link may be made by co-molding or overmolding. This ensures better continuity between the gasket and the remainder of the link.

The assembly of the invention may also include one or more of the characteristics listed below:

- The box and the link include positioning means for positioning the link on the box. In addition, the link may include means for positioning the part, preferably means for centering it. In addition, the link may include an orifice designed to co-operate with a positioning finger provided on the window.
- The box and the link are covered in a common continuous film of paint once the link has been put into place on the box. This serves to further improve watertightness at the interface between these two elements of the assembly.
- The link includes preparatory holder means for holding the link on the box. In particular, these means may comprise a metal staple for engaging in a rib of the box. Thus, it is made easier to place the link on the box prior to the operation of painting the box.
- The box includes at least two adhesive tracks for receiving two distinct parts, the link including at least two adhesive track segments additional to respective ones of the adhesive tracks of the box.
- The sealing gasket extends between two adjacent ends of two adhesive track segments. This makes it possible to further improve watertightness of the tailgate by improving sealing at the link-to-box connection. This portion of the gasket is stressed in compression since it is surrounded by two gasket portions, each compressed respectively by a part that is adhesively bonded by means of the corresponding adhesive track.
- The link includes spacer means for spacing a part, and the adhesive track segment for receiving said part. This avoids the bead of adhesive on the adhesive track being flattened and as a result provides better adhesive bonding between the part, the box and the link.
- The link includes holder means for holding at least one cable installed in the section member. Thus, the link includes numerous additional functional elements, thus making it possible to avoid fitting other elements on the box to perform these functions.

The link closes the cross-section of at least one section member essentially over its entire length. The link thus performs a decorative function by hiding the upright, which would become visible in the event of the window being suitable for opening. This avoids incorporating yet another bodywork skin with the box.

The link is made at least in part out of ABS (acrylobutadiene styrene). This makes it possible to make both the gasket and the remainder of the link, with it being ensured that these portions are compatible. In particular, the sealing gasket is made of a mixture of ABS and elastomer.

The assembly has four links, each designed to be fitted on the box, each in the vicinity of an end of one of the uprights.

The invention also provides a link designed to be fitted on a motor vehicle tailgate box and forming part of an assembly of the invention.

The invention also provides a tailgate box forming part of an assembly of the invention.

BRIEF DESCRIPTION OF THE DRAWINGS

The invention can be better understood on reading the following description given purely by way of example and made with reference to the accompanying drawings, in which:

FIG. 2bis is a view of the FIG. 2 part fitted on a tailgate box;

DETAILED DESCRIPTION

Figure 1:
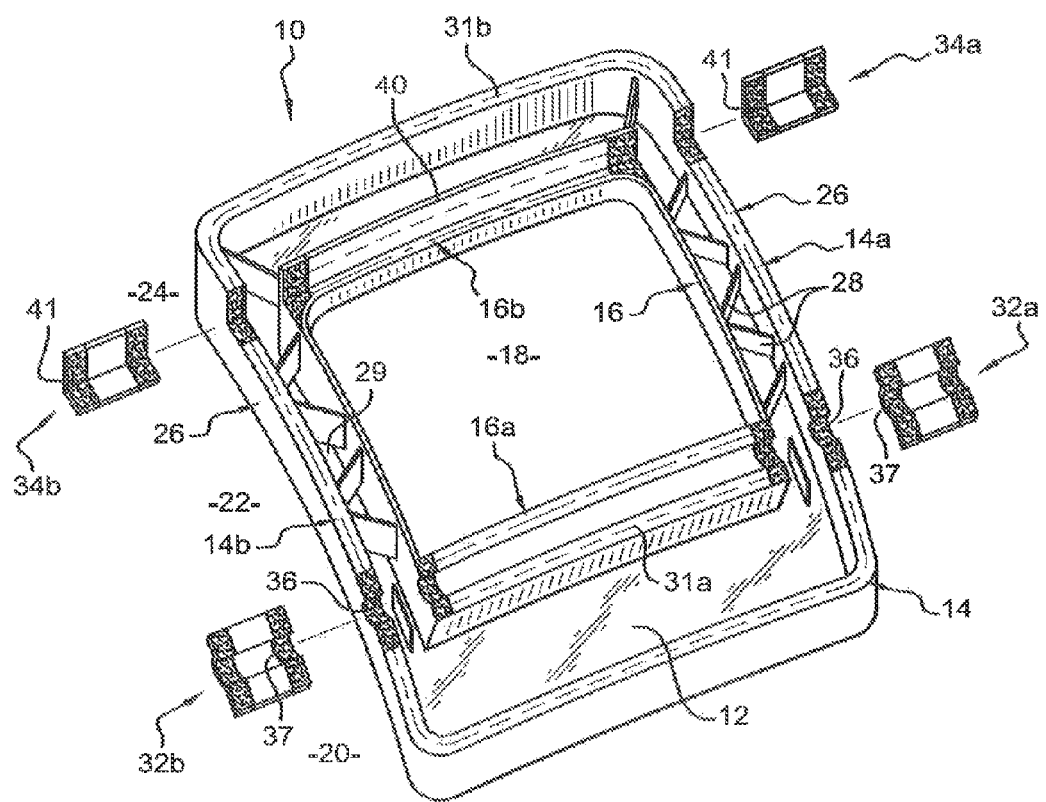
FIG. 1 is a diagrammatic perspective view of the assembly in a particular embodiment of the invention, comprising a tailgate box and links for fitting to the box.

FIG. 1 shows a tailgate box 10 made of plastics material. The box 10 comprises a bottom 12 and walls 14, 16 defining the sides of the tailgate box, the walls extending essentially perpendicularly from the bottom and having respective free ends designed to face towards the outside of the vehicle when the tailgate is mounted on the vehicle.

The wall 14 forms an outer frame for defining the outline of the tailgate, and the wall 16 forms an inner frame defining an opening 18 in the box for receiving a rear window that is to be fitted to the box by adhesive (not shown in the figures).

The box is subdivided into three portions. Firstly it has a bottom portion 20 extending between the bottom wall of the outer frame 14 and the bottom wall 16a of the inner frame 16, this portion being designed to be covered by a bodywork skin, in particular a capping strip. It also has a top portion 24 extending between the top wall 16b of the inner frame 16 and the top wall of the outer frame 14. This portion is likewise designed to be covered by a bodywork skin, in particular a spoiler.

The box also has an intermediate portion 22 defined by the top and bottom walls 16b and 16a of the inner frame 16. This intermediate portion 22 includes the opening 18 together with two lateral uprights 26 interconnecting the bottom and top portions 20 and 24. One upright extends on each side of the opening 18.

Each upright forms a section member of open cross-section, in particular of channel section, with its concave sides facing towards the outside of the vehicle when the tailgate is mounted on the vehicle. The web of each upright is constituted by the bottom 12 of the box and its flanges are formed by respective ones of the vertical walls of the frames 14 and 16. A gap 29 is left between the side walls 14 and 16 of the upright.

Each upright also has stiffening ribs 28 for stiffening the tailgate box. Each rib 28 forms a wall projecting from the bottom 12 of the upright 26 and extending between the walls 14 and 16 of the section member, across the gap 29.

The window is designed to be fitted to the box 10 so as to cover the opening 18 and extend to the walls 14a, 14b of the uprights forming parts of the outer frame 14. As a result, it overlies the uprights 26.

In order to receive the window, the box has an adhesive track 30 (drawn in chain-dotted lines). The adhesive track 30 is arranged on the free ends of the top and bottom walls 16b, 16a of the inner frame 16 and also on the free ends of the side walls 14a, 14b forming parts of the outer frame 14.

The box also has two adhesive tracks 31a and 31b formed respectively in the bottom and top portions 20 and 24 of the box, on a horizontal wall 16a or 16b of the inner frame and on the frame 14, in particular on the vertical walls 14a, 14b of the frame. These adhesive tracks enable the capping strip and the spoiler to be fitted onto the bottom and top portions of the box.

Nevertheless, because of the shape of each upright 26, the top and bottom walls 16b, 16a of the frame 16 and the vertical walls 14a and 14b of the uprights are spaced apart by the gap. They therefore do not meet each other and the adhesive tracks 30, 31a, 31b are thus interrupted.

In order to ensure that the box is more leaktight, the assembly in this embodiment also includes four links for fitting on the box, in particular two links 32a and 32b for fitting in line with the bottom wall 16a of the inner frame 16, and two links 34a and 34b for fitting in line with the top wall 16b of the inner frame 16.

The box and the links are shaped so that the links 32a, 32b, 34a, and 34b form respective bridges, each having one end connected to a horizontal wall 16a, 16b of the frame 16 and an opposite end connected to a vertical wall 14a, 14b of the frame 14, and by spanning the gap. Each link has one face that is designed to face towards the outside of the vehicle when the tailgate is mounted on the vehicle and that includes an additional segment of adhesive track, thereby enabling the adhesive track 30 to be made complete.

In order to receive the links 32a and 32b, the box has a seat 36 constituted by depressions formed along the bottom wall 16a of the frame 16 and in the side walls 14a and 14b, these depressions being in alignment. These depressions co-operate with a projection 37 of complementary shape formed on one side of the link 32a, 32b that is to face towards the inside of the vehicle. The depressions 36 and the projections 37 form means for positioning the links 32a, 32b on the box.

In addition, in order to receive the links 34a, 34b, the top wall 16b of the frame 16 and the top end of the vertical wall 14 of the uprights have aligned projections 40 arranged in such a manner that, at their top ends, the walls 14a, 14b, and 16b form a right angle enabling each of the links 34a and 34b to be received, each link likewise presenting a right angle 41. The means 40, 41 form means for positioning the links 34a and 34b on the box.

Figure 2:
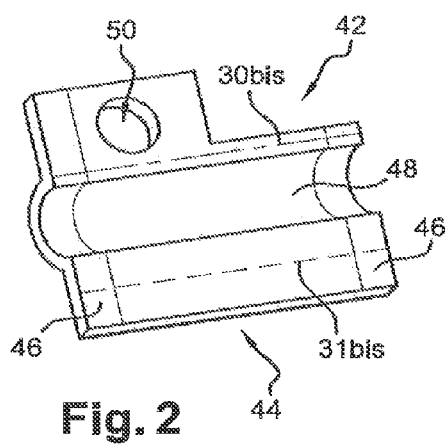
FIG. 2 is a side view of a link of the assembly in a particular embodiment of the invention, designed to face towards the outside of the vehicle when the tailgate is mounted on the vehicle.

FIGS. 2 and 2bis show in detail another embodiment of a link 42 of the invention for fitting to the box of FIG. 1 so as to extend the bottom wall of the inner frame 16.

As can be seen in FIG. 2, this link has two portions. It comprises in particular a rigid central portion 44 and at each lateral end of the part that is to come into contact respectively with the inner frame 16 or the outer frame 14 of the box, the link 42 has a flexible portion 46. This flexible portion forms a sealing gasket that works in compression.

Figure 3:
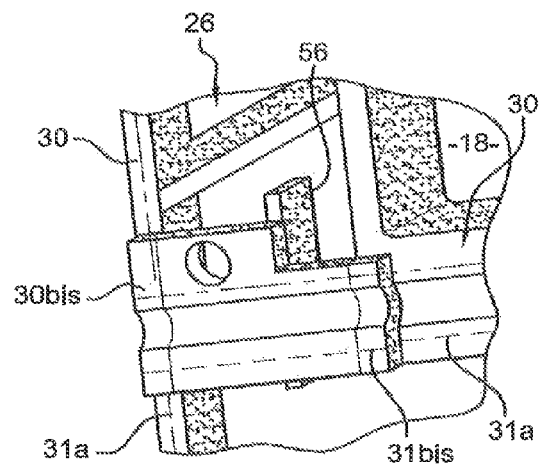
FIG. 3 is a side view of the FIG. 2 link, designed to face towards the inside of the vehicle when the tailgate is mounted on the vehicle.
Figure 3:
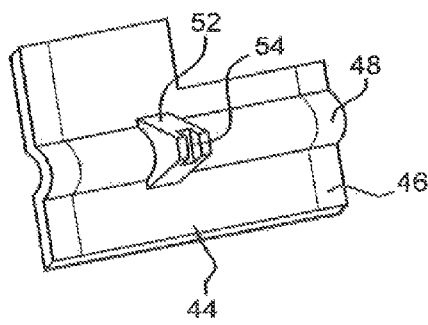

As can be seen in FIGS. 2 to 3, a projection formed in the link is exactly complementary to a depression 36 of the box. The link 42 is thus easily positioned on the box. The part 42, when put into place on the box, serves to close the channel section formed by each of the uprights 26 locally by spanning the gap 29 thereof. It thus connects the frame 14 locally to the frame 16.

The face of the part 42 that can be seen in FIGS. 2 and 2bis has a complementary segment of adhesive track 30bis drawn in chain-dotted lines for the purpose of filling the gap in the adhesive track 30. This adhesive track segment 30bis is arranged on the link 42 so as to extend the adhesive track 30 on the box, as can be seen more particularly in FIG. 2bis.

Similarly, the link has a complementary adhesive track segment 31bis for filling the gap in the adhesive track 31a for the capping strip and arranged on the link 42 to extend the track 31a of the box. The tracks 30bis and 31bis are mutually parallel, as are the adhesive tracks 30 and 31a of the box.

Each gasket 46 forms an end of the adhesive track segments 30bis and 31bis and also extends between two adjacent ends of these portions situated at the same end of the link, so as to form an extreme portion of the projection 48, thereby further improving leaktightness of the connection between the link and the box.

As can be seen in FIG. 2, the part 42 also has an orifice 50. This orifice 50 constitutes positioning means, and more particularly means for centering the window. It is designed to co-operate with a positioning finger formed on the window.

An orifice such as the orifice 50 may be formed in two parts that are designed to be placed on the box, in particular two parts for placing in line with the bottom wall 16a of the frame 16. The orifice of one of the two links is of shape complementary to the positioning finger of the window, while the orifice of the other one of the two parts is shaped so that the positioning finger can occupy a plurality of positions within the orifice so as to accommodate dimensional dispersion between windows.

As can be seen in FIG. 3, showing the other side of the FIG. 2 link, i.e. the side that is to face towards the inside of the vehicle, the rigid portion 44 of the part 42 also has a projecting portion 52 that includes a groove 54 at its end. The groove 54 is designed to receive a metal staple (not shown in the figure) suitable for engaging in a rib 56 provided for this purpose on the box and shown in FIG. 2bis.

The staple forms means for provisionally holding the part on the box.

Figure 4:
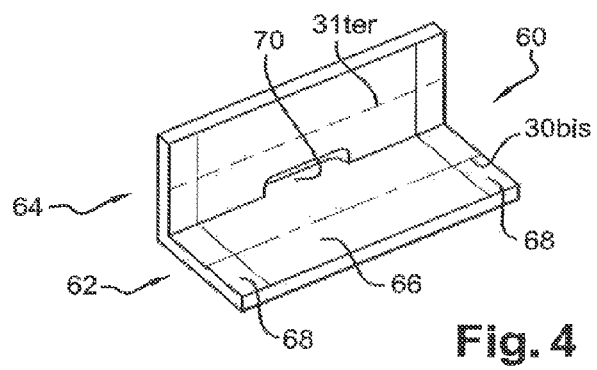
FIG. 4 is a side view of a link in another embodiment of the invention, designed to face towards the outside of the vehicle when the tailgate is mounted on the vehicle.

FIG. 4 shows a link 60 for arranging in line with the top wall 16b of the frame 16. This link has two walls 62 and 64 that form a right angle between them. Each of these walls also has a rigid portion 66 and, at each of its ends for coming respectively into contact with the frames 14 or 16, a flexible portion 68 forming a sealing gasket.

On a side that is to face towards the outside of the vehicle when the tailgate is mounted on the vehicle, this link also includes two adhesive track segments 30bis, 31ter formed respectively on each of the walls 62, 64. The adhesive track segment 30bis formed on the wall 62 is drawn in chain-dotted lines and serves to receive the window. It is arranged on the link so as to extend the adhesive track 30 of the box and it is designed to span the gap in said track 30. The adhesive track segment 31ter is drawn in dashed lines and is for receiving the spoiler. It is arranged on the part so as to extend the adhesive tack 31b of the box for spanning the gap in said track 31b.

This link also has a depression 70 formed in the wall 64 and serving, by co-operating with a tongue of the spoiler presenting a length greater than the depth of the depression, to mark the spacing between the adhesive strip 31b, 31ter and the bodywork skin.

The link for the assembly of the invention is made by co-molding and is of small dimensions, preferably of dimensions that are less than 20 centimeters so as to reduce the fabrication costs involved. The gasket and the rigid portion are both made of ABS (acrylobutadiene styrene). In particular, the gasket is made of a mixture of ABS and elastomer. The two portions are therefore compatible, thereby making the co-molding operation easier.

Assembly of the tailgate is described briefly below.

In a first step, the links are mounted on the box, in particular on the seats 36 and 40 of the box, with the staples of the links co-operating with the ribs of the box. The box is then painted, with the links being painted simultaneously therewith. This operation serves to improve the leaktightness of the box-and-link assembly since a common continuous film of paint is deposited over the links and over the box.

Thereafter, the window and the bodywork skins are put into place by being adhesively bonded to the box and to the link part. Once the window has been put into place it compresses the flexible portions of the link parts against the box, said portions then forming gaskets that are subjected to compression, thereby serving to prevent water from passing between the box and the link part.

It should be observed that the invention is not limited to the embodiment described above. For example, the design of the links and of the box is not restricted to the shapes and the materials described above.

In addition, at least one of the links may include an additional function, e.g. a function of holding cables installed in the section member with the help of clip-fastener means.

In addition, a single link may close the upright completely, it then being necessary to have only two links to ensure better adhesive bonding of the window. The link then performs an additional function of improving appearance by hiding the upright, which is particularly recommended if the window can be opened.

It is also possible that the link including an adhesive track for the window to be made integrally with the bodywork skin and to be constituted by a lug formed projecting from said bodywork skin.

What is claimed is:

1. An assembly comprising a tailgate box and at least one link designed to be fitted on the box, wherein the box is designed to receive a part that is fastened to the box by adhesive, said box having for this purpose an adhesive track, the box also including at least one lateral upright comprising a section member of open cross-section with an opening therein interrupting the adhesive track, and wherein the link comprises an additional segment of adhesive track, the link and the upright being shaped so that the link can be fitted on the upright in such a manner that the link closes the cross-section of the section member and causes the additional segment to span the interruption in the adhesive track.

2. An assembly according to claim 1, wherein the link includes at least one sealing gasket constituting an end of the link for receiving the adhesive track segment.

3. An assembly according to claim 2, wherein the gasket is made integrally with the remainder of the link.

4. An assembly according to claim 1, wherein the box and the link include at least one of a depression and a projections positioning the link on the box.

5. An assembly according to claim 4, wherein the link includes an orifice for positioning the part.

6. An assembly according to claim 1, wherein the box and the link are covered in a common continuous film of paint once the link has been put into place on the box.

7. An assembly according to claim 1, wherein the link includes preparatory holder means for holding the link on the box.

8. An assembly according to claim 1, wherein the box includes at least two adhesive tracks for receiving two distinct parts, the link including at least two adhesive track segments additional to respective ones of the adhesive tracks of the box.

9. An assembly according to claim 8, wherein the link includes at least one sealing gasket constituting an end of the link for receiving the adhesive track segment, and wherein the sealing gasket extends between two adjacent ends of two adhesive track segments.

10. An assembly according to claim 1, wherein the link includes spacer means for spacing a part, and the adhesive track segment for receiving said part.

11. An assembly according to claim 1, wherein the link spans a gap defined between side walls of the upright.

12. An assembly according to claim 1, wherein the link is made at least in part out of ABS.

13. A link suitable for being fitted on a tailgate box having an adhesive track for receiving a part that is fastened to the box by adhesive, and at least one lateral upright comprising a section member of open cross-section with an opening interrupting the adhesive track, the link including a segment of adhesive track and being shaped to be fitted on the upright in such a manner that the link closes the cross-section of the section member and causes the adhesive track segment of the link to span the interruption in the adhesive track of the box.

14. A tailgate box suitable for receiving a part fastened to the box by adhesive, the box including for this purpose an adhesive track and also including at least one lateral upright comprising a section member of open cross-section with an opening interrupting the adhesive track, the box being suitable for receiving a link including a segment of adhesive track, the upright being shaped so that the link can be fitted on the upright in such a manner that the link closes the cross-section of the section member and causes the adhesive track segment of the link to span the interruption in the adhesive track of the box.

15. An assembly according to claim 3, wherein the gasket is integrally made with the remainder of the link by one of co-molding and overmolding.

\* \* \* \* \*